(12) United States Patent
Wu (10) Patent No.: US 12,049,404 B2
(45) Date of Patent: Jul. 30, 2024

(54) SPHERICAL GRAPHITE FOR LITHIUM BATTERY AND PREPARATION METHOD THEREOF

(71) Applicants: ZHANJIANG JUXIN NEW ENERGY CO., LTD, Guangdong (CN); GUANGDONG DONGDAO NEW ENERGY CO., LTD., Guangdong (CN)

(72) Inventor: Qi Xiu Wu, Guangdong (CN)

(73) Assignees: ZHANJIANG JUXIN NEW ENERGY CO., LTD, Guangdong (CN); GUANGDONG DONGDAO NEW ENERGY CO., LTD., Guangdong (CN)

( * ) Notice: Subject to any disclaimer, the term of this patent is extended or adjusted under 35 U.S.C. 154(b) by 659 days.

(21) Appl. No.: 17/269,688

(22) PCT Filed: Aug. 28, 2019

(86) PCT No.: PCT/CN2019/103064
§ 371 (c)(1),
(2) Date: Feb. 19, 2021

(87) PCT Pub. No.: WO2020/043131
PCT Pub. Date: Mar. 5, 2020

(65) Prior Publication Data
US 2021/0316994 A1 Oct. 14, 2021

(30) Foreign Application Priority Data

Aug. 31, 2018 (CN) .......................... 201811009725.1
Aug. 31, 2018 (CN) .......................... 201811009745.9

(51) Int. Cl.
*C01B 32/21* (2017.01)
*B02C 23/08* (2006.01)
(Continued)

(52) U.S. Cl.
CPC .............. *C01B 32/21* (2017.08); *B02C 23/08* (2013.01); *H01M 4/583* (2013.01);
(Continued)

(58) Field of Classification Search
CPC ..... C01B 32/21; C01B 32/182; C01B 32/184; C01B 32/186; C01B 32/188; C01B 32/19;
(Continued)

(56) References Cited

U.S. PATENT DOCUMENTS

| 2004/0053050 A1* | 3/2004 | Guerfi ................. H01M 50/109 204/290.15 |
| 2009/0136849 A1* | 5/2009 | Yue ...................... H01M 4/1393 427/77 |
| 2016/0185603 A1* | 6/2016 | Bozalina ................. C30B 33/00 252/502 |

FOREIGN PATENT DOCUMENTS

| CN | 1558458 A | 12/2004 |
| CN | 201120305 Y | 9/2008 |

(Continued)

OTHER PUBLICATIONS

Chelgani, et al., A Review of Graphite Beneficiation Techniques, Mineral Processing and Extractive Metallurgy Review 2016; 37(1):58-68 (Year: 2016).*

(Continued)

*Primary Examiner* — Daniel C. McCracken
(74) *Attorney, Agent, or Firm* — NKL Law; Allen Xue (57) ABSTRACT

A preparation method for a spherical graphite for lithium batteries firstly adopts a combination of primary pulverization, secondary pulverization and shaping to produce spherical graphite with $D_{50}$ of 13-25 μm, and then adopts a combination of ultrafine primary pulverization, ultrafine secondary pulverization and shaping to produce spherical graphite of small particle size with $D_{50}$ of 3-12 μm from tailings produced during the production of spherical graphite (Continued)

with $D_{50}$ of 13-25 μm for the first time. The method increases the utilization rate of graphite raw materials by 25-35%, and can prepare spherical graphite with $D_{50}$ of 13-25 μm and spherical graphite with $D_{50}$ of 3-12 μm at the same time. An alternative method adopts a combination of primary pulverization, secondary pulverization, ultrafine primary pulverization, ultrafine secondary pulverization and shaping to produce spherical graphite of small particle size with $D_{50}$ of 13-25 μm directly from raw materials for the first time.

20 Claims, 3 Drawing Sheets

(51) Int. Cl.
    *H01M 4/02*           (2006.01)
    *H01M 4/583*         (2010.01)
    *H01M 10/0525*     (2010.01)

(52) U.S. Cl.
    CPC ..... *H01M 10/0525* (2013.01); *C01P 2004/32* (2013.01); *C01P 2004/61* (2013.01); *C01P 2006/11* (2013.01); *C01P 2006/12* (2013.01); *H01M 2004/021* (2013.01); *H01M 2004/027* (2013.01)

(58) Field of Classification Search
    CPC ................ C01B 32/192; C01B 32/194; C01B 32/196; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/215; C01B 32/22; C01B 32/225; C01B 32/23; B02C 23/08; H01M 4/583; H01M 10/0525; H01M 2004/021; H01M 2004/027; H01M 4/587; C01P 2004/32; C01P 2004/61; C01P 2006/11; C01P 2006/12; Y02E 60/10
See application file for complete search history.

(56) References Cited

FOREIGN PATENT DOCUMENTS

| | | | |
|---|---|---|---|
| CN | 101367518 A | 2/2009 | |
| CN | 101850965 A | 10/2010 | |
| CN | 101905883 A | 12/2010 | |
| CN | 101976735 A | 2/2011 | |
| CN | 105728159 A | 7/2016 | |
| CN | 107195903 * | 9/2017 | ........ H01M 10/0525 |
| CN | 107195903 A | 9/2017 | |

OTHER PUBLICATIONS

Translation of the Written Opinion of the International Search Authority in PCT/CN2019/103064 (2019) (Year: 2019).*

* cited by examiner

SPHERICAL GRAPHITE FOR LITHIUM BATTERY AND PREPARATION METHOD THEREOF

The present application claims the priority of the prior application NO. 201811009745.9 submitted to China National Intellectual Property Administration on Aug. 31, 2018 and entitled "Method and device for preparing spherical graphite". The entire contents of the prior application are incorporated herein by reference.

The present application claims the priority of the prior application NO. 201811009725.1 submitted to China National Intellectual Property Administration on Aug. 31, 2018 and entitled "Method and device for preparing spherical graphite for power battery". The entire contents of the prior application are incorporated herein by reference.

The present application is a national stage entry of PCT International Application No. PCT/CN2019/103064, filed on Aug. 28, 2019.

FIELD OF THE INVENTION

The application belongs to the technical field of graphite preparation, and relates to a spherical graphite for lithium battery and a preparation method thereof, especially to a spherical graphite with median diameter $D_{50}$ of 3-25 μm and a preparation method thereof.

BACKGROUND OF THE INVENTION

Lithium-ion batteries have a series of advantages such as high specific capacity, high working voltage, good safety, and no memory effect, and are widely used in portable electronic equipment such as notebook computers, mobile phones and instruments. With the popularization of new energy vehicles, the application range of lithium-ion batteries has expanded to electric vehicles and other fields. In recent years, with the increasing requirements for miniaturization, light weight, multi-function, and long-term driving of electronic products and vehicle-mounted energy storage devices, the requirements for high energy density and high rate performance of lithium-ion batteries are continuously increasing.

At present, the negative electrode materials of commercial lithium-ion batteries are still dominated by graphite materials. Among them, natural graphite is widely used because of its high charge and discharge capacity, good charge and discharge voltage platform, wide sources and low cost. However, natural graphite has fatal disadvantages of big loss of the first irreversible capacity and fast capacity decay during cycling. In order to improve the electrochemical performance of natural graphite, it is necessary to modify the surface of natural graphite materials. For various modified graphite, natural flake graphite is firstly pulverized and processed into spherical particles to increase the tap density. In Chinese patent application document CN101976735A, natural graphite is made into spherical particles through multiple low-speed and high-speed pulverization and grinding; in Chinese patent application document CN1558458A, natural graphite is made into spherical particles through multiple high-speed and low-speed pulverization and grinding; in Chinese Patent Application Document CN101905883A, multiple jet mills are connected to prepare spherical graphite; in Chinese patent application document CN101367518A, natural flake graphite is subjected to primary pulverization in a mechanical pulverizer, and then to circular grinding in multiple shaping classifiers connected in series to prepare spherical graphite; and in Chinese patent application document CN101850965A, natural flake graphite is subjected to 5 jet milling units connected in series and 14 spheroidizing units connected in series to prepare spherical graphite.

The above-mentioned applications have a commonality, that is, natural graphite is usually subjected to multiple pulverization, spheroidization and shaping, classification and screening processes to give spherical graphite with a median particle size ($D_{50}$) of 14-25 μm. The spherical graphite in this particle size can only be used to prepare negative electrode materials for capacity-type lithium-ion batteries but cannot be used to prepare negative electrode materials for rate-type lithium-ion batteries. Moreover, the yield is generally only 30-40%, and the remaining 60-70% of the graphite powder tailings can only be used as cheap metallurgical recarburizers or refractory materials, thus wasting resources and increasing the cost pressure on enterprises. Therefore, it is necessary to develop a new production process for spherical graphite, which can increase product yield, reduce costs, and can produce spherical graphite with $D_{50}$ of 3-25 μm so as to meet the needs of the lithium battery industry for spherical graphite with various $D_{50}$.

SUMMARY OF THE INVENTION

The objective of the present invention is to provide spherical graphite for lithium ion batteries and a preparation method thereof. The technical problem to be solved is to prepare spherical graphite with a $D_{50}$ of 3-25 μm from natural graphite, so as to meet the needs of the lithium battery industry for spherical graphite with various particle sizes.

The present invention solves the above technical problem through the following technical solutions:

A preparation method of spherical graphite, comprising the following steps:

Step (1) primary pulverization: conveying natural flake graphite or earthy graphite with a particle size of 0.074-0.8 mm and a carbon content of more than 90% into one or more groups (for example, 2-8 groups, such as 2-4 groups) of primary pulverizing units in series;

Step (2) secondary pulverization: conveying the graphite powder obtained in step (1) into one or more groups (for example, 1-6 groups, such as 1-4 groups) of secondary pulverizing units in series;

optional step (3) shaping: conveying the graphite powder obtained in step (2) into one or more groups (for example, 1-6 groups, such as 1-3 groups) of final pulverizing units in series;

Step (4) ultrafine primary pulverization: conveying the graphite tailings collected in step (3) and/or the graphite powder collected after the secondary pulverization of step (2) into one or more groups (for example, 2-8 groups, such as 2-4 groups) of primary ultrafine pulverizing units in series;

Step (5) ultrafine secondary pulverization: conveying the graphite powder collected in step (4) into one or more groups (for example, 1-6 groups, such as 1-3 groups) of secondary ultrafine pulverizing units in series;

Step (6) shaping: conveying the graphite powder collected in step (5) into two or more groups (for example, 2-10 groups, such as 2-5 groups) of final ultrafine pulverizing units in series; and optional step (7) purification and drying.

According to the invention, the graphite particles collected from the last group of secondary pulverizing units in step (2) may be shaped into spherical graphite particles with $D_{50}$ of 13-25 μm through step (3), or they may go straight to step (4) without going through step (3) to continue the pulverization and classification processing and then prepare spherical graphite with $D_{50}$ of 3-12 μm. When step (3) is not included in the above method, spherical graphite particles with $D_{50}$ of 3-12 μm can be prepared; and when step (3) is included, spherical graphite particles with $D_{50}$ of 13-25 μm and those with $D_{50}$ of 3-12 μm can be prepared.

According to the invention, in step (1), the primary pulverization is carried out by groups of primary pulverizing units. Each group of the primary pulverizing units includes at least two pulverizers and one cyclone collector; wherein, each pulverizer includes a pulverizer inlet and a pulverizer outlet, the cyclone collector includes a cyclone collector inlet, a cyclone collector outlet, and a cyclone collector dust outlet; the at least two pulverizers and one cyclone collector are connected in series, wherein, the cyclone collector outlet is connected to the pulverizer inlet in the next group of primary pulverizing units, or connected to the inlet of the secondary pulverizing units, and the cyclone collector dust outlet is connected to dust removal equipment, such as a dust collector and a high-pressure centrifugal fan.

According to the invention, in step (1), the speed of the classifying impellers of the pulverizers is increased from 1000 rpm to 2000 rpm one by one, and the speed increment of each pulverizer from the second one is equal or unequal; and the pulverization time of each pulverizer is 10-20 minutes. Exemplarily, in step (1), two groups of primary pulverizing units in series are adopted, and each group of primary pulverizing units includes three pulverizers. Thus 6 pulverizers in total in step (1). Among them, the speed of the classifying impeller of the first pulverizer is 1000 rpm, the speed of the classifying impeller of the sixth pulverizer is 2000 rpm, and the speed of the classifying impellers of the remaining 4 pulverizers increases gradually in order of materials with the increment being equal or unequal.

According to the invention, in step (1), the $D_{50}$ of the graphite powder collected from the cyclone collector in the last group of the primary pulverizing units is preferably 20-30 μm.

According to the invention, in step (2), the re-pulverization is carried out by groups of secondary pulverizing units. Each group of the secondary pulverizing units includes at least two pulverizers, one classifier and one cyclone collector; wherein each pulverizer includes a pulverizer inlet and a pulverizer outlet, the classifier includes a classifier inlet, a first outlet of the classifier, and a second outlet of the classifier, and the cyclone collector includes a cyclone collector inlet, a cyclone collector outlet, and a cyclone collector dust outlet. The at least two pulverizers, one classifier and one cyclone collector are connected in series, wherein, the first outlet of the classifier is connected to the cyclone collector inlet, the second outlet of the classifier and the cyclone collector outlet are connected in parallel to the pulverizer inlet in the next group of secondary pulverizing units, or connected in parallel to the inlet of the final pulverizing units, or connected in parallel to the inlet of the primary ultrafine pulverizing units. Alternatively, the at least two pulverizers, one classifier and one cyclone collector are connected in series, wherein, the first outlet of the classifier is connected to the cyclone collector inlet, the second outlet of the classifier and the cyclone collector outlet are connected in parallel to the pulverizer inlet in the next group of secondary pulverizing units. In the last group of secondary pulverizing units, the second outlet of the classifier is connected to a first stock bin, the cyclone collector outlet is connected to a first tailing bin, and the cyclone collector dust outlet is connected to dust removal equipment, such as a dust collector and a high-pressure centrifugal fan.

Preferably, the cyclone collector outlet and the outlet of the dust removal equipment are connected in parallel to the first tailing bin.

Further preferably, the cyclone collector outlet and the outlet of the dust collector are connected in parallel to the first tailing bin.

According to the invention, in step (2), the speed of the classifying impellers of the pulverizers is increased from 2500 rpm to 4000 rpm one by one, and the speed increment of each pulverizer from the second one is equal or unequal. The pulverization time of each pulverizer is 20-35 minutes.

According to the invention, in step (2), the speed of the classifying impeller of the classifier is maintained at 3500 rpm.

According to the invention, in step (2), the $D_{50}$ of the graphite powder collected from the second outlet of the classifier and the cyclone collector outlet in the last group of secondary pulverizing units is preferably 13-25 μm, the tap density is <0.9 g/cm$^3$. The graphite particles are spherical, approximately spherical, oval, potato-shaped; as there are a lot of fine powder on the surface of the graphite particles, the surface is rough, and the sphericity is poor.

According to the invention, in step (3), the shaping of the particles is carried out by groups of final pulverizing units. Each group of the final pulverizing units includes at least two pulverizers, one classifier and one cyclone collector; wherein, each pulverizer includes a pulverizer inlet and a pulverizer outlet, the classifier includes a classifier inlet, a first outlet of the classifier, and a second outlet of the classifier, and the cyclone collector includes a cyclone collector inlet, a cyclone collector outlet, and a cyclone collector dust outlet. The at least two pulverizers, one classifier and one cyclone collector are connected in series, wherein, the first outlet of the classifier is connected to the cyclone collector inlet, and the second outlet of the classifier and the cyclone collector outlet are connected in parallel to the pulverizer inlet in the next group of final pulverizing units. In the last group of final pulverizing units, the second outlet of the classifier is connected to a first stock bin, the cyclone collector outlet is connected to a first tailing bin, and the cyclone collector dust outlet is connected to dust removal equipment, such as a dust remover and a high-pressure centrifugal fan.

Preferably, the cyclone collector outlet and the outlet of the dust removal equipment are connected in parallel to the first tailing bin.

Also preferably, the cyclone collector outlet and the outlet of the dust collector are connected in parallel to the first tailing bin.

According to the invention, in step (3), the speed of the classifying impellers of the pulverizers is decreased from 3000 rpm to 2000 rpm one by one, the speed decrement of each pulverizer is equal or unequal. The pulverization time of each pulverizer is 20-25 minutes.

According to the invention, in step (3), if there is only one group of final pulverizing units, the speed of the classifying impeller of the classifier is 2500 rpm; and if there are two or more groups, the speed of the classifying impellers of the classifiers reduces from 3500 rpm to 2500 rpm one by one.

According to the invention, in step (3), the shape of the graphite particles collected from the second outlet of the classifier in the last group of the final pulverizing units is spherical, approximately spherical, oval, and potato-shaped. The $D_{50}$ of the graphite particles is preferably 13-25 μm, for example, 14-16 μm, 15-17 μm, 17-19 μm, 20-23 μm, etc.; the graphite particle size is preferably in the range of 3.5-60 μm, for example 5-60 μm, 5-45 μm, 6-50 μm, 7-60 μm; the tap density is ≥0.9 g/cm$^3$, for example, 0.9-1.2 g/cm$^3$; and the specific surface area is 4.5-8.5 m$^2$/g. There is no fine powder on the surface of the graphite particles. The surface is smooth, and the sphericity is good.

According to the invention, in step (3), the $D_{50}$ of the graphite tailing particles collected in the first tailing bin is preferably 8-13 μm, for example, 8-10 μm, 9-11 μm, 10-12 μm, etc. The graphite particle size is preferably in the range of 1-45 μm, for example, 5-40 μm, 1-30 μm, 3-30 μm, 5-45 μm; and the tap density is ≥0.3 g/cm$^3$, for example, 0.3-0.6 g/cm$^3$.

According to the invention, the pulverizers used in step (1), step (2) and step (3) have the same structure, mainly composed of turbine, main shaft, classifying impeller, screen and other components. The pulverizer is at least one of airflow vortex micro-pulverizer, high-pressure mill micro-pulverizer, rod mechanical micro-pulverizer, impact micro-pulverizer, and pendulum mill, preferably airflow vortex micro-pulverizer. The classifier is at least one of an air flow classifier, a jet classifier, and a micron classifier. The output of each pulverizer in step (1) is 50-1500 kg/h, preferably 800-1200 kg/h; and the outputs of each pulverizer in step (2) and each pulverizer in step (3) are 30-800 kg/h, preferably 200-500 kg/h.

According to the invention, in step (4), each group of the primary ultrafine pulverizing units includes at least two ultrafine pulverizers, one ultrafine classifier and one cyclone collector; wherein, each ultrafine pulverizer includes an ultrafine pulverizer inlet and an ultrafine pulverizer outlet, the ultrafine classifier includes an ultrafine classifier inlet, a first outlet of the ultrafine classifier, and a second outlet of the ultrafine classifier, and the cyclone collector includes a cyclone collector inlet, a cyclone collector outlet, and a cyclone collector dust outlet. The at least two ultrafine pulverizers, one ultrafine classifier and one cyclone collector are connected in series, wherein, the first outlet of the ultrafine classifier is connected to the cyclone collector inlet, the second outlet of the ultrafine classifier and the cyclone collector outlet are connected in parallel to the next group of primary ultrafine pulverizing units, or connected in parallel to the inlet of the secondary ultrafine pulverizing units, and the cyclone collector dust outlet is connected to dust removal equipment, such as a dust remover and a high-pressure centrifugal fan.

According to the invention, in step (4), the speed of the classifying impellers of the ultrafine pulverizers is increased from 800 rpm to 1600 rpm one by one, and the speed increment of each pulverizer from the second one is equal or unequal. The pulverization time of each ultrafine pulverizer is 15-25 minutes.

According to the invention, in step (4), the speed of the classifying impeller of the ultrafine classifier is maintained at 5000 rpm.

According to the invention, in step (4), the $D_{50}$ of the graphite powder collected from the second outlet of the classifier and the cyclone collector outlet in the last group of the primary ultrafine pulverizing units is preferably 5-14 μm, and the tap density is 0.7-0.85 g/cm$^3$.

According to the invention, in step (5), each group of the secondary ultrafine pulverizers includes at least two ultrafine pulverizers, one ultrafine classifier and one cyclone collector; wherein, each ultrafine pulverizer includes an ultrafine pulverizer inlet and an ultrafine pulverizer outlet, the ultrafine classifier includes an ultrafine classifier inlet, a first outlet of the ultrafine classifier and a second outlet of the ultrafine classifier, and the cyclone collector includes a cyclone collector inlet, a cyclone collector outlet, and a cyclone collector dust outlet. The at least two ultrafine pulverizers, one ultrafine classifier and one cyclone collector are connected in series, wherein, the first outlet of the ultrafine classifier is connected to the cyclone collector inlet, the second outlet of the ultrafine classifier and the cyclone collector outlet are connected in parallel to the next group of secondary ultrafine pulverizing units. The cyclone collector dust outlet is connected to dust removal equipment, such as a dust remover and a high-pressure centrifugal fan.

According to the invention, in step (5), the speed of the classifying impellers of the ultrafine pulverizers is increased from 1000 rpm to 2000 rpm one by one, and the speed increment of each pulverizer from the second one is equal or unequal; and the pulverization time of each ultrafine pulverizer is 20-35 minutes.

According to the invention, in step (5), the speed of the classifying impeller of the ultrafine classifier is maintained at 5000 rpm.

According to the invention, in step (5), the $D_{50}$ of the graphite powder collected from the second outlet of the classifier and the cyclone collector outlet in the last group of secondary ultrafine pulverizing units is preferably 3-12 μm, the tap density is <0.6 g/cm$^3$; the graphite particles are spherical, approximately spherical, oval, potato-shaped; as there are a lot of fine powder on the surface of graphite particles, the surface is rough, and the sphericity is poor.

According to the invention, in step (6), each group of the final ultrafine pulverizer units includes at least two ultrafine pulverizers, one ultrafine classifier and one cyclone collector; wherein, each ultrafine pulverizer includes an ultrafine pulverizer inlet and an ultrafine pulverizer outlet, the ultrafine classifier includes an ultrafine classifier inlet, a first outlet of the ultrafine classifier, and a second outlet of the ultrafine classifier, and the cyclone collector includes a cyclone collector inlet, a cyclone collector outlet, and a cyclone collector dust outlet. The at least two ultrafine pulverizers, one ultrafine classifier and one cyclone collector are connected in series, wherein, the first outlet of the ultrafine classifier is connected to the cyclone collector inlet, the second outlet of the ultrafine classifier and the cyclone collector outlet are connected in parallel to the pulverizer inlet in the next group of final ultrafine pulverizing units. In the last group of final ultrafine pulverizing units, the second outlet of the ultrafine classifier is connected to a second stock bin, and the cyclone collector outlet is connected to a second tailing bin; and the cyclone collector dust outlet is connected to dust removal equipment, such as a dust remover and a high-pressure centrifugal fan.

Preferably, the cyclone collector outlet and the outlet of the dust removal equipment are connected in parallel to the first tailing bin.

Also preferably, the cyclone collector outlet and the outlet of the dust collector are connected in parallel to the first tailing bin.

According to the invention, in step (6), the speed of the classifying impellers of the ultrafine pulverizers is decreased from 1600 rpm to 1000 rpm one by one, and the speed decrement of each pulverizer is equal or unequal; and the pulverization time of each ultrafine pulverizer is 10-15 minutes.

According to the invention, in step (6), the speed of the classifying impellers of the ultrafine classifiers is decreased from 5000 rpm to 3000 rpm one by one.

According to the invention, in step (6), the $D_{50}$ of the graphite particles collected in the second stock bin is preferably 3-12 μm, for example 3-5 μm, 5-7 μm, 8-10 μm, 11-12 μm, etc. The graphite particle size is preferably in the range of 1-45 μm, for example, 1-30 μm, 2-45 μm, 3-45 μm, 6-30 μm. The tap density is ≥0.55 g/cm$^3$, for example 0.55-0.9 g/cm$^3$; and the specific surface area is 8.5-15.0 m$^2$/g. The graphite particles are spherical, approximately spherical, oval, and potato-shaped. There is no fine powder on the surface of graphite particles. The surface is smooth, and the sphericity is good.

According to the invention, the ultrafine pulverizers used in step (4), step (5) and step (6) have the same structure, and integrate the dual functions of ultrafine pulverization and airflow classification, and thus can complete the two processing procedures of ultrafine pulverization and micro powder sorting at the same time. The ultrafine pulverizer is at least one of an airflow ultrafine pulverizering classifier, a jet ultrafine pulverizering classifier, a vertical ultrafine pulverizer and a horizontal ultrafine pulverizer, preferably an airflow ultrafine pulverizer. The ultrafine classifier is an airflow ultrafine classifier; the output of each ultrafine pulverizer in step (4) is 50-1500 kg/h, preferably 800-1200 kg/h; the outputs of each ultrafine pulverizer in step (5) and each ultrafine pulverizer in step (6) are 15-600 kg/h, preferably 200-500 kg/h.

According to the invention, in step (7), the purification is acid purification.

Preferably, in step (7), the purification refers to the reaction of an acidic aqueous solution with the materials. The acidic aqueous solution is one of hydrochloric acid, hydrofluoric acid, nitric acid, and sulfuric acid, or a mixed aqueous solution of more than one of them. Preferably, the acidic aqueous solution is a mixed aqueous solution of the multiple acids, and the ratio of the acids is preferably hydrochloric acid:hydrofluoric acid:nitric acid:sulfuric acid=(0-4):(1-2):(0-4):(0-2). The purification reaction is carried out at a temperature of 50-120° C., preferably 50-100° C. The time of the purification is 1-24 hours. The fixed carbon content of the purified natural graphite is greater than 99.95%. After the purification in step (7) is completed, the materials are preferably dried.

The present invention achieves the following beneficial effects:

1. The invention firstly adopts a combination of primary pulverization, secondary pulverization and shaping to produce spherical graphite with $D_{50}$ of 13-25 μm, and then adopts a combination of ultrafine primary pulverization, ultrafine secondary pulverization and shaping to produce spherical graphite of small particle size with $D_{50}$ of 3-12 μm from tailings produced during the production of spherical graphite with $D_{50}$ of 13-25 μm for the first time. The method increases the utilization rate of graphite raw materials by 25%-35%, and can meet the needs of the lithium battery industry for spherical graphite with various particle sizes.

2. The present invention adopts the combination of primary pulverization, secondary pulverization, ultrafine primary pulverization, ultrafine secondary pulverization and shaping to produce spherical graphite of small particle size with $D_{50}$ of 3-12 μm directly from raw materials for the first time, which meets the requirements of the negative electrode materials for rate-type batteries and high-end lithium battery.

3. The spherical graphite prepared by the invention has good sphericity, uniform particle size distribution and high tap density.

4. The method of the present invention connects multiple groups of single pulverizating equipment end to end. The raw materials are subjected to the first stage of pulverization and then are directly conveyed to the next stage of cyclic pulverization and classification, with pipelines arranged in the middle for the transportation. The entire set of devices is fully sealed. After dust removal, the dust-laden airflow is concentrated into the underdrain and then subjected to the secondary dust removal treatment, which achieves pollution-free emissions.

DETAILED DESCRIPTION OF THE INVENTION

The present invention is further illustrated in combination of the following specific examples. It should be understood that these examples are only intended to illustrate the present invention but not to limit the scope of the present invention. In addition, it should be understood that after reading the content of the present invention, those skilled in the art can make various changes or modifications to the present invention, and these equivalent forms also fall within the scope defined by the present invention. The process flow chart of the present invention is shown in FIG. 1.

Figure 1:
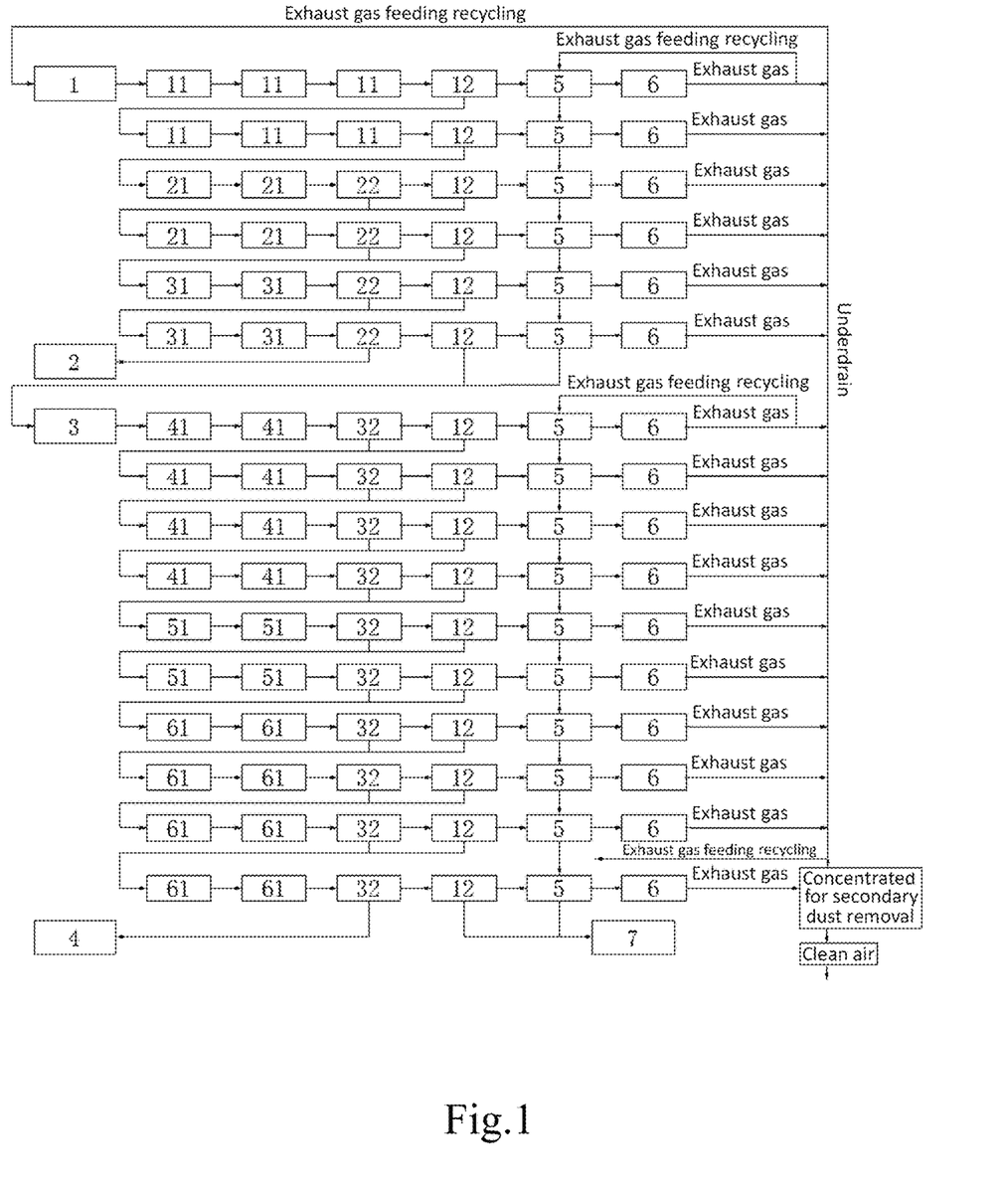
FIG. 1 is a process flow diagram of a preferred example of the present invention.

11, 21 and 31 in FIG. 1 represent airflow vortex micropulverizers, 12 represents a cyclone collector, 22 represents an airflow classifier, 32 represents an airflow ultrafine classifier, 41, 51 and 61 represent ultrafine pulverizers, 2 represents a first stock bin, namely, a stock bin for products with $D_{50}$ of 13-25 μm, 3 represents a first tailing bin, 4 represents a second stock bin, namely, a stock bin for products with $D_{50}$ of 3-12 μm, 5 represents a dust collector, 6 represents a high-pressure centrifugal fan, and 7 represents a second tailing bin.

Among them, three pulverizers of 11, one cyclone collector of 12, one dust collector of 5 and one high-pressure centrifugal fan of 6 form a group of primary pulverizing units, and there are two groups of primary pulverizing units in total; two pulverizers of 21, one airflow classifier of 22, one cyclone collector of 12, one dust collector of 5 and one high-pressure centrifugal fan of 6 form a group of secondary pulverizing units, and there are two groups of secondary pulverizing units in total; two pulverizers of 31, one airflow classifier of 22, one cyclone collector of 12, one dust collector of 5 and one high-pressure centrifugal fan of 6 form a group of final pulverizing units, and there are two groups of final pulverizing units in total.

The materials collected from the airflow classifier 22 in the last group of final pulverizing units are conveyed to the stock bin for products with $D_{50}$ of 13-25 μm and stored for use in the lithium-ion battery production, or they can also be conveyed to the first tailing bin to continue the pulverization process. The tailings collected from the cyclone collector 12 and the dust collector 5 in the last group of final pulverizing units are conveyed to the first tailing bin for continuing the pulverization process.

Two ultrafine pulverizers of 41, one airflow ultrafine classifier of 32, one cyclone collector of 12, one dust collector of 5 and one high-pressure centrifugal fan of 6 form a group of primary ultrafine pulverizing units, and there are four groups of primary ultrafine pulverizing units in total; two ultrafine pulverizers of 51, one airflow ultrafine classifier of 32, one cyclone collector of 12, one dust collector of 5 and one high-pressure centrifugal fan of 6 form a group of secondary ultrafine pulverizing units, and there are two groups of secondary ultrafine pulverizing units in total; two ultrafine pulverizers of 61, one airflow ultrafine classifier of 32, one cyclone collector of 12, one dust collector of 5 and one high-pressure centrifugal fan of 6 form a group of final ultrafine pulverizing units, and there are four groups of final ultrafine pulverizing units in total.

The present invention is further described in details with reference to the drawings and examples. The preparation method of the spherical graphite for use in lithium batteries of the present invention includes the following steps:

Step (1): The natural flake graphite or earthy graphite with a particle size of 0.074-0.8 mm and a carbon content of not less than 90% were conveyed to 2-4 groups of primary pulverizing units in series through a 0.3-0.6 MPa high-pressure feeding sealed pipeline. The speed of the classifying impellers of the pulverizers was 1000 rpm-2000 rpm, and the rotating speed was gradually increased. The pulverization time of each pulverizer was 10-20 minutes.

As the speed of each pulverizer gradually increased, the $D_{50}$ of the obtained graphite particles gradually decreased. At lower speed and shorter time, the impact force on the graphite particles was smaller, which prevented the graphite raw material from producing a large number of particles with a diameter of less than 4 μm during the primary pulverization process and improved the product yield.

Step (2): The material of step (1) was conveyed to 1-3 groups of the secondary pulverizing units in series through a 0.3-0.6 MPa high-pressure feeding sealed pipeline. The speed of the classifying impellers of the pulverizers was 2500 rpm-4000 rpm, and was gradually increased; the pulverization time of each pulverizer was 20-35 minutes; and the speed of the classifying impeller of the classifier was 3500 rpm.

Figure 2:
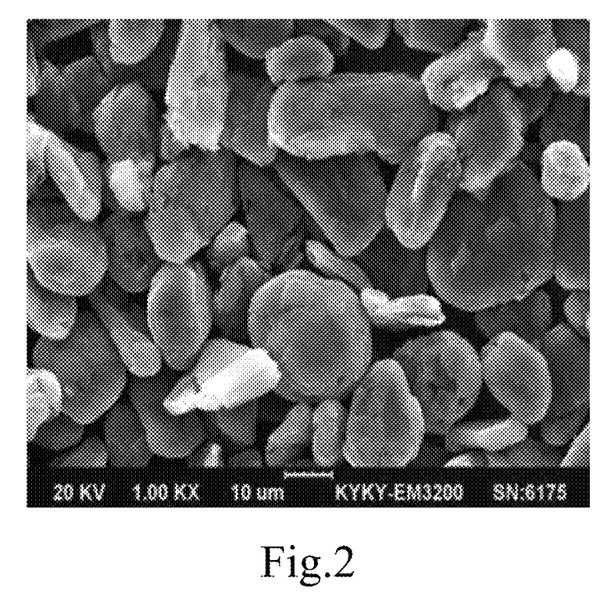
FIG. 2 is a scanning electron microscope image of a product with $D_{50}$=17 μm according to a preferred example of the present invention.

In the secondary pulverization process, the speed of the pulverizer was high, the pulverization time was long, and the impact force on the graphite particles was large. The $D_{50}$ of the graphite particles decreased rapidly until it reached the particle size required for the negative electrode material of the capacity-type lithium ion battery. The shape of the graphite particles became spherical, approximately spherical, oval, or potato-shaped. However, a large amount of fine-grained graphite appeared, rendering the particle size uneven (FIG. 2). At the time, the tap density of graphite particles was <0.9 g/cm$^3$.

Step (3): The material of step (2) was conveyed to 1-3 groups of the final pulverizing units of in series through a 0.3-0.6 MPa high-pressure feeding sealed pipeline. The speed of the classifying impellers of the pulverizers was decreased from 3000 rpm to 2000 rpm one by one, and the pulverization time of each pulverizer was 20-25 minutes.

Figure 3:
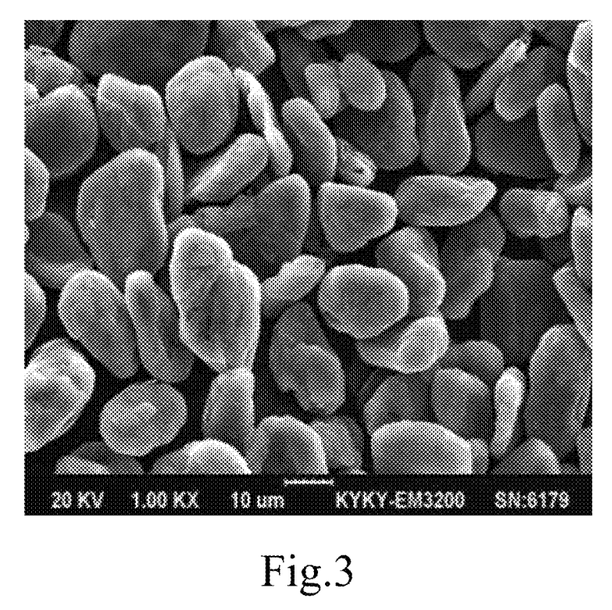
FIG. 3 is a scanning electron microscope image of a product with $D_{50}$=17 μm according to a preferred example of the present invention.

After step (2), the graphite particle size ($D_{50}$ was 13-25 μm) met the requirements of the negative electrode material of capacity-type lithium ion batteries, but the tap density was less than 0.9 g/cm$^3$, which could not meet the requirements of use. The speed of the final pulverizer was lower, the impact force on the graphite particles was smaller, and the surface was gradually polished while the shape and particle size basically did not change. As the speed of the classifying impeller of each classifier was decreased from 3500 rpm to 2500 rpm, the classifier and cyclone collector gradually discharged a large amount of fine powder. Therefore, the obtained of graphite particles had uniform particle size distribution, with no fine powder on the surface. The surface of the graphite particles was smooth, and the sphericity was good (FIG. 3). The graphite particles collected from the second outlet of the classifier in the last group had $D_{50}$ of 13-25 μm, and tap density of >0.9 g/cm$^3$. The graphite tailings collected from the cyclone collector outlet and optionally the outlet of the dust removal device had $D_{50}$ of preferably 8-15 μm, and tap density of 0.3-0.6 g/cm$^3$.

Step (4): The tailings were conveyed to 2-4 groups of ultrafine pulverizing units in series through a 0.3-0.6 MPa high-pressure feeding sealed pipeline. The speed of the classifying impellers of the pulverizers was 800 rpm-1600 rpm, and was gradually increased. The pulverization time of each pulverizer was 10-20 minutes. The speed of the classifying impeller of the classifier was 5000 rpm.

The ultrafine pulverizer could complete ultrafine pulverization and fine powder classification at the same time. It pulverized the tailings at lower speed and shorter time, the graphite particles of qualified particle size flowed into the classifier automatically with the airflow, and were classified again, which avoided the occurrence of a large number of graphite particles with a diameter of less than 1 μm during the ultrafine pulverization process of the tailings. As the speed of each ultrafine pulverizer gradually increased, the $D_{50}$ of graphite particles was gradually reduced to 5-14 μm, and the tap density was 0.7-0.8 g/cm$^3$.

Step (5): The graphite powder collected in step (4) was conveyed to 1-3 groups of secondary ultrafine pulverizing units in series through a 0.3-0.6 MPa high-pressure feeding sealed pipeline. The speed of the classifying impellers of the pulverizers was increased from 1000 rpm to 2000 rpm one by one. The pulverization time of each ultrafine grinder was 20-35 minutes. The speed of the classifying impeller of the classifier was 5000 rpm.

In the secondary ultrafine pulverization process, the classifying impeller had a high speed and a long acting time, and the impact force on the graphite particles was large. The $D_{50}$ of graphite particles decreased rapidly until it reached the particle size of the negative electrode material of rate-type lithium ion batteries ($D_{50}$ was 3-12 μm), and the shape of the graphite particles changed to spherical, approximately spherical, oval, or potato-shaped. However, a large amount of fine-grained graphite appeared, rendering the particle size uneven, and tap density was <0.5 g/cm$^3$.

Step (6) Shaping: the graphite powder collected in step (5) was conveyed to 3-5 groups of final ultrafine pulverizing units in series. The speed of the classifying impellers of the pulverizers was decreased from 1600 rpm to 1000 rpm one by one, and the pulverization time of each ultrafine pulverizer was 20-35 minutes.

Figure 4:
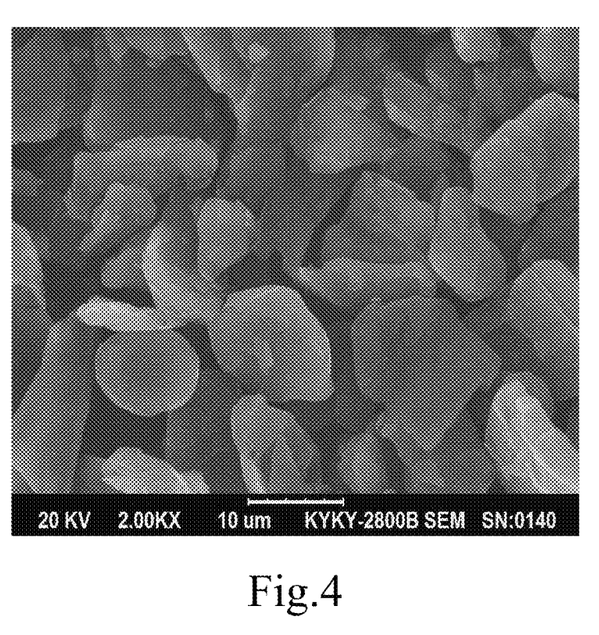
FIG. 4 is a scanning electron microscope image of a product with $D_{50}$=8 μm according to a preferred example of the present invention.

After step (5), the graphite particle size ($D_{50}$ was 3-12 μm) met the requirements for the negative electrode material of rate-type lithium ion batteries, but the tap density was less than 0.5 g/cm$^3$, which could not meet the requirements. The speed of the final ultrafine pulverizer was lower, and the impact force on the graphite particles was smaller, the specific surface was gradually polished and smooth, while the shape and particle size basically did not change. As the speed of the classifying impellers of the ultrafine classifiers of each group was decreased from 5000 rpm to 3000 rpm, the ultrafine classifier and cyclone collector gradually discharged a large amount of fine powder. The graphite particles had uniform particle size distribution, had no fine powder on the surface, the surface was smooth, and the sphericity was good (FIG. 4). The graphite particles collected from the second outlet of the ultrafine classifier had $D_{50}$ of 3-12 μm and tap density of >0.75 g/cm³. Waste was collected from the cyclone collector outlet and optionally the outlet of the dust removal device.

Step (7) Purification: the natural spherical graphite was reacted with a mixed acid solution of hydrochloric acid, hydrofluoric acid, nitric acid and sulfuric acid at a mass ratio of (0-4):(1-2):(0-4):(0-2) at 50-120° C. for 1-24 hours, and then was washed with water to neutral and dried. The purified natural graphite had d fixed carbon content of greater than 99.95%.

Examples 1-9

The process flow of Examples 1-9 was described above, and the specific process parameters are shown in Table 1. The test data of Example 1-9 are shown in Table 2 and Table 3.

TABLE 1

Process parameters of Examples 1-9

| Example | (1) primary pulverization | (2) secondary pulverization | (3) shaping | (4) ultrafine primary pulverization | (5) ultrafine secondary pulverization | (6) shaping | (7) purification |
|---|---|---|---|---|---|---|---|
| 1 | 2 groups of 2 pulverizers in series, speed increasing gradually from 1000 rpm to 2000 rpm, 20 min for each pulverizer | 3 groups of 2 pulverizers in series, speed increasing gradually from 2500 rpm to 4000 rpm, 20 min for each pulverizer | 3 groups of 2 pulverizers in series, speed decreasing gradually from 3000 rpm to 2000 rpm, 20 min for each pulverizer | 3 groups of 2 pulverizers in series, speed increasing gradually from 800 rpm to 1600 rpm, 20 min for each pulverizer | 2 groups of 2 pulverizers in series, speed increasing gradually from 1000 rpm to 2000 rpm, 20 min for each pulverizer | 5 groups of 2 pulverizers in series, speed decreasing gradually from 1600 rpm, to 1000 rpm, 20 min for each pulverizer | reacting with a mixed acid solution of hydrochloric acid, hydrofluoric acid, and nitric acid at a mass ratio of 4:2:2 at 95° C. for 12 hours |
| 2 | 2 groups of 2 pulverizers in series, speed increasing gradually from 1000 rpm to 2000 rpm, 20 min for each pulverizer | 3 groups of 2 pulverizers in series, speed increasing gradually from 2500 rpm to 4000 rpm, 20 min for each pulverizer | 2 groups of 2 pulverizers in series, speed decreasing gradually from 3000 rpm to 2000 rpm, 20 min for each pulverizer | 3 groups of 2 pulverizers in series, speed increasing gradually from 800 rpm to 1600 rpm, 20 min for each pulverizer | 2 groups of 2 pulverizers in series, speed increasing gradually from 1000 rpm to 2000 rpm, 20 min for each pulverizer | 4 groups of 2 pulverizers in series, speed decreasing gradually from 1600 rpm to 1000 rpm, 20 min for each pulverizer | reacting with a mixed acid solution of hydrochloric acid, hydrofluoric acid and nitric acid at a mass ratio of 4:1:2 at 90° C. for 16 hours |
| 3 | 2 groups of 2 pulverizers in series, speed increasing gradually from 1000 rpm to 2000 rpm, 20 min for each pulverizer | 3 groups of 2 pulverizers in series, speed increasing gradually from 2500 rpm to 4000 rpm, 20 min for each pulverizer | 1 groups of 2 pulverizers in series, speed decreasing gradually from 3000 rpm to 2000 rpm, 20 min for each pulverizer | 3 groups of 2 pulverizers in series, speed increasing gradually from 800 rpm to 1600 rpm, 20 min for each pulverizer | 2 groups of 2 pulverizers in series, speed increasing gradually from 1000 rpm to 2000 rpm, 20 min for each pulverizer | 3 groups of 2 pulverizers in series, speed decreasing gradually from 1600 rpm to 1000 rpm, 20 min for each pulverizer | reacting with a mixed acid solution of hydrochloric acid, hydrofluoric acid and nitric acid at a mass ratio of 4:1:1 at 95° C. for 24 hours |
| 4 | 2 groups of 3 pulverizers in series, speed increasing gradually from 1000 rpm to 2000 rpm, 20 min for each pulverizer | 2 groups of 2 pulverizers in series, speed increasing gradually from 2500 rpm to 4000 rpm, 20 min for each pulverizer | 3 groups of 2 pulverizers in series, speed decreasing gradually from 3000 rpm to 2000 rpm, 20 min for each pulverizer | 2 groups of 2 pulverizers in series, speed increasing gradually from 800 rpm to 1600 rpm, 20 min for each pulverizer | 3 groups of 2 pulverizers in series, speed increasing gradually from 1000 rpm to 2000 rpm, 20 min for each pulverizer | 4 groups of 2 pulverizers in series, speed decreasing gradually from 1600 rpm to 1000 rpm, 20 min for each pulverizer | reacting with a mixed acid solution of hydrochloric acid, hydrofluoric acid and nitric acid at a mass ratio of 4:2:2 at 95° C. for 12 hours |
| 5 | 2 groups of 3 pulverizers in series, speed increasing gradually from 1000 rpm to 2000 rpm, 20 min | 2 groups of 2 pulverizers in series, speed increasing gradually from 2500 rpm to 4000 rpm, 20 min | 3 groups of 2 pulverizers in series, speed decreasing gradually from 3000 rpm to 2000 rpm, 20 min | 3 groups of 2 pulverizers in series, speed increasing gradually from 800 rpm to 1600 rpm, 20 min | 3 groups of 2 pulverizers in series, speed increasing gradually from 1000 rpm to 2000 rpm, 20 min | 4 groups of 2 pulverizers in series, speed decreasing gradually from 1600 rpm to 1000 rpm, 20 min | reacting with a mixed acid solution of hydrochloric acid, hydrofluoric acid and nitric acid at a mass ratio |

TABLE 1-continued

Process parameters of Examples 1-9

| Example | (1) primary pulverization | (2) secondary pulverization | (3) shaping | (4) ultrafine primary pulverization | (5) ultrafine secondary pulverization | (6) shaping | (7) purification |
|---|---|---|---|---|---|---|---|
| | for each pulverizer | for each pulverizer | for each pulverizer | for each pulverizer | for each pulverizer | for each pulverizer | of 4:2:2 at 95° C. for 12 hours |
| 6 | 2 groups of 3 pulverizers in series, speed increasing gradually from 1000 rpm to 2000 rpm, 20 min for each pulverizer | 2 groups of 2 pulverizers in series, speed increasing gradually from 2500 rpm to 4000 rpm, 20 min for each pulverizer | 2 groups of 2 pulverizers in series, speed decreasing gradually from 3000 rpm to 2000 rpm, 20 min for each pulverizer | 4 groups of 2 pulverizers in series, speed increasing gradually from 800 rpm to 1600 rpm, 20 min for each pulverizer | 2 groups of 2 pulverizers in series, speed increasing gradually from 1000 rpm to 2000 rpm, 20 min for each pulverizer | 4 groups of 2 pulverizers in series, speed decreasing gradually from 1600 rpm to 1000 rpm, 20 min for each pulverizer | reacting with a mixed acid solution of hydrochloric acid, hydrofluoric acid and nitric acid at a mass ratio of 4:1:2 at 90° C. for 16 hours |
| 7 | 3 groups of 2 pulverizers in series, speed increasing gradually from 1000 rpm to 2000 rpm, 20 min for each pulverizer | 2 groups of 2 pulverizers in series, speed increasing gradually from 2500 rpm to 4000 rpm, 20 min for each pulverizer | 1 groups of 2 pulverizers in series, speed decreasing gradually from 3000 rpm to 2000 rpm, 20 min for each pulverizer | 3 groups of 2 pulverizers in series, speed increasing gradually from 800 rpm to 1600 rpm, 20 min for each pulverizer | 2 groups of 2 pulverizers in series, speed increasing gradually from 1000 rpm to 2000 rpm, 20 min for each pulverizer | 3 groups of 2 pulverizers in series, speed decreasing gradually from 1600 rpm to 1000 rpm, 20 min for each pulverizer | reacting with a mixed acid solution of hydrochloric acid, hydrofluoric acid and nitric acid at a mass ratio of 4:1:1 at 95° C. for 24 hours |
| 8 | 3 groups of 3 pulverizers in series, speed increasing gradually from 1000 rpm to 2000 rpm, 20 min for each pulverizer | 2 groups of 2 pulverizers in series, speed increasing gradually from 2500 rpm to 4000 rpm, 20 min for each pulverizer | 1 groups of 2 pulverizers in series, speed decreasing gradually from 3000 rpm to 2000 rpm, 20 min for each pulverizer | 4 groups of 2 pulverizers in series, speed increasing gradually from 800 rpm to 1600 rpm, 20 min for each pulverizer | 1 groups of 2 pulverizers in series, speed increasing gradually from 1000 rpm to 2000 rpm, 20 min for each pulverizer | 5 groups of 2 pulverizers in series, speed decreasing gradually from 1600 rpm to 1000 rpm, 20 min for each pulverizer | reacting with a mixed acid solution of hydrochloric acid, hydrofluoric acid and nitric acid at a mass ratio of 4:2:2 at 95° C. for 12 hours |
| 9 | 3 groups of 3 pulverizers in series, speed increasing gradually from 1000 rpm to 2000 rpm, 20 min for each pulverizer | 4 groups of 2 pulverizers in series, speed increasing gradually from 2500 rpm to 4000 rpm, 20 min for each pulverizer | not done | 2 groups of 2 pulverizers in series, speed increasing gradually from 800 rpm to 1600 rpm, 20 min for each pulverizer | 3 groups of 2 pulverizers in series, speed increasing gradually from 1000 rpm to 2000 rpm, 20 min for each pulverizer | 3 groups of 2 pulverizers in series, speed decreasing gradually from 1600 rpm to 1000 rpm, 20 min for each pulverizer | reacting with a mixed acid solution of hydrochloric acid, hydrofluoric acid and nitric acid with a mass ratio of 4:1:1 at 95° C. for 24 hours |

In the above Examples 1-9, in step (2), the speed of the classifying impeller of the classifier was maintained at 3500 rpm; in step (3), if there was only one group, the speed of the classifying impeller of the classifier was 2500 rpm, and if there were two or more groups, the speed of the classifying impellers of the classifiers was decreased from 3500 rpm to 2500 rpm one by one; in step (4), the speed of the classifying impeller of the ultrafine classifier was maintained at 5000 rpm; in step (5), the speed of the classifying impeller of the ultrafine classifier was maintained at 5000 rpm; and in step (6), the speed of the classifying impellers of the ultrafine classifiers was decreased from 5000 rpm to 3000 rpm one by one.

The expression "increasing gradually" described in the above Examples 1-9 refers to gradually increasing with the same increment, and the expression "decreasing gradually" refers to gradually decreasing with the same decrement.

In the primary pulverization of step (1) described in the above table, the expression of "2 groups of 2 pulverizers in series" refers to two groups of primary pulverizing units in series, wherein, there are two pulverizers connected in series in each group of primary pulverizing units; other expressions such as "2 groups of 3 pulverizers" have the similar meaning, and thus they are not repeated here.

The expression "speed gradually increasing from 1000 rpm to 2000 rpm" in the primary pulverization of step (1) in the above table means that the speed of the classifying impellers of the 2 groups of 2 pulverizers in series gradually is increased from 1000 rpm to 2000 rpm; that is to say, there are two groups of primary pulverizing units in series, and each group has 2 pulverizers connected in series, that is, there are 4 pulverizers in total, and the speed of the classifying impellers of these 4 pulverizers is gradually increased from 1000 rpm to 2000 rpm.

Other steps in other examples have the same meaning, and thus they are not repeated here.

The spherical graphite of the above Examples 1-9 were tested for the physical and chemical indexes, and the details are as follows: an image particle analyzer was used to measure the sphericity of the samples; a laser particle size analyzer was used to test the particle size distribution of the samples; Quantachrome Auto Tap was used to measure the tap density; a BET method of nitrogen adsorption was used to measure the specific surface area; an atomic absorption spectrometer was used to measure the fixed carbon content of the samples; a scanning electron microscope was used to test the microscopic morphology of the samples. The test results are as follows:

In the above table: in Examples 1-8: product yield=the weight of the spherical graphite in the second stock bin/the weight of the first tailings.

In the above table: in Example 9: product yield=the weight of the spherical graphite in the second stock bin/the weight of the raw materials.

It can be seen from the above examples, the spherical graphite prepared by the method of the invention has high yield, good sphericity, and high tap density; moreover, the method can produce spherical graphite with $D_{50}$ of 13-25 μm and spherical graphite with $D_{50}$ of 3-12 μm, which can meet the requirements of lithium battery industry for spherical graphite with various $D_{50}$ particle sizes.

TABLE 2

Test data of graphite powder collected from the second outlet of the classifier in the last group in step (3) of Examples 1-8

| Example | Sphericity | Particle size/μm | $D_{10}$/μm | $D_{50}$/μm | $D_{90}$/μm | Tap density/ (g/cm³) | Specific surface area/ (m²/g) | Product yield % | Fixed carbon content % |
|---|---|---|---|---|---|---|---|---|---|
| Example 1 | 0.9 | 7.0-60 | 15 | 25 | 36 | 1.2 | 4.8 | 55 | 99.95 |
| Example 2 | 0.8 | 7.0-60 | 10 | 25 | 40 | 1.12 | 5.6 | 52 | 99.9 |
| Example 3 | 0.6 | 4.0-60 | 9 | 25 | 45 | 1.05 | 6.5 | 50 | 99.0 |
| Example 4 | 0.9 | 6.5-60 | 14 | 23 | 33 | 1.1 | 5.4 | 55 | 99.95 |
| Example 5 | 0.9 | 4.0-60 | 9 | 19 | 38 | 1.02 | 5.0 | 55 | 99.95 |
| Example 6 | 0.8 | 4.0-60 | 9 | 19 | 40 | 0.98 | 6.0 | 52 | 99.9 |
| Example 7 | 0.6 | 5.0-45 | 11 | 17 | 28 | 0.95 | 7.0 | 50 | 99.0 |
| Example 8 | 0.9 | 5.0-45 | 10 | 15 | 24 | 1.0 | 6.8 | 55 | 99.95 |

In the above table: product yield=the weight of the spherical graphite in the first stock bin/the weight of the raw materials.

The embodiments of the present invention have been described above; however, the present invention is not limited to the above embodiments. Any modification, Table 3

Test data of graphite powder collected from the second outlet of the ultrafine classifier in the last group in step (6) of Examples 1-9

| Example | Sphericity | Particle size/μm | $D_{10}$/μm | $D_{50}$/μm | $D_{90}$/μm | Tap density/ (g/cm³) | Specific surface area/ (m²/g) | Product yield % | Fixed carbon content % |
|---|---|---|---|---|---|---|---|---|---|
| Example 1 | 0.9 | 2.5-23 | 6.2 | 8 | 13 | 0.92 | 9.2 | 70 | 99.95 |
| Example 2 | 0.8 | 2.5-23 | 5.4 | 8 | 13 | 0.85 | 10.0 | 65 | 99.9 |
| Example 3 | 0.6 | 2.0-30 | 4.5 | 8 | 15 | 0.78 | 10.5 | 60 | 99.0 |
| Example 4 | 0.9 | 3.0-30 | 6.5 | 11 | 18 | 1.0 | 8.0 | 55 | 99.95 |
| Example 5 | 0.9 | 1.5-22 | 3.5 | 5 | 10 | 0.76 | 12.4 | 55 | 99.95 |
| Example 6 | 0.8 | 1.5-22 | 3.5 | 5 | 10 | 0.76 | 12.4 | 52 | 99.9 |
| Example 7 | 0.6 | 1.0-30 | 3.0 | 6 | 16 | 0.78 | 12.0 | 50 | 99.0 |
| Example 8 | 0.6 | 1.0-18 | 1.0 | 3 | 8 | 0.6 | 15.8 | 40 | 99.95 |
| Example 9 | 0.8 | 3.5-30 | 6.5 | 11 | 18 | 0.9 | 8.4 | 60 | 99.0 | equivalent replacement and improvement made within the spirit and principle of the present invention should be included in the protection scope of the invention.

The invention claimed is:

1. A preparation method of spherical graphite, comprising:
   step (1): conducting primary pulverization by conveying natural flake graphite or earthy graphite with a particle size of 0.074-0.8 mm and a carbon content of more than 90% into one or more groups of primary pulverizing units in series, each group of the primary pulverizing units has at least two pulverizers and one cyclone collector;
   step (2): conducting secondary pulverization by conveying a graphite powder obtained in step (1) into one or more groups of secondary pulverizing units in series, each group of secondary pulverizing units has at least two pulverizers, one classifier and one cyclone collector;
   step (3): performing first shaping by conveying a graphite powder obtained in step (2) into one or more groups of final pulverizing units in series to obtain a graphite tailing, each group of the final pulverizing units has at least two pulverizers, one classifier and one cyclone collector;
   step (4): conducting ultrafine primary pulverization by conveying the graphite tailing collected in step (3) into one or more groups of primary ultrafine pulverizing units in series, each group of the primary ultrafine pulverizing units has at least two ultrafine pulverizers, one ultrafine classifier and one cyclone collector;
   step (5): conducing ultrafine secondary pulverization by conveying a graphite powder collected in step (4) into one or more groups of secondary ultrafine pulverizing units in series, each group of the secondary ultrafine pulverizers has at least two ultrafine pulverizers, one ultrafine classifier and one cyclone collector;
   step (6): performing second shaping: conveying a graphite powder collected in step (5) into two or more groups of final ultrafine pulverizing units in series, each group of the final ultrafine pulverizer units has at least two ultrafine pulverizers, one ultrafine classifier and one cyclone collector; and
   optional step (7): performing purification and drying.

2. The method according to claim 1, wherein, in step (1), each pulverizer has a pulverizer inlet and a pulverizer outlet, and the cyclone collector has a cyclone collector inlet, a cyclone collector outlet, and a cyclone collector dust outlet; the at least two pulverizers and one cyclone collector are connected in series, and the cyclone collector outlet is connected to the pulverizer inlet in another group of primary pulverizing units, or connected to the pulverizer inlet of the secondary pulverizing units; the cyclone collector dust outlet is connected to dust removal equipment;
   the speed of classifying impellers of the pulverizers is increased from 1000 rpm to 2000 rpm one by one, and the speed increment of each pulverizer from the second one is equal or unequal; and
   the pulverization time of each pulverizer is 10-20 minutes.

3. The method according to claim 2, wherein, in step (1), the graphite powder collected from the cyclone collector in the last group of the primary pulverizing units has a $D_{50}$ of 20-30 µm.

4. The method according to claim 1, wherein, in step (2), each pulverizer has a pulverizer inlet and a pulverizer outlet, the classifier has a classifier inlet, a first outlet of the classifier, and a second outlet of the classifier, and the cyclone collector has a cyclone collector inlet, a cyclone collector outlet, and a cyclone collector dust outlet; the at least two pulverizers, one classifier and one cyclone collector are connected in series, wherein the first outlet of the classifier is connected to the cyclone collector inlet, the second outlet of the classifier and the cyclone collector outlet are connected in parallel to the pulverizer inlet of another group of secondary pulverizing units, or connected in parallel to the inlet of the final pulverizing units, or connected in parallel to the inlet of the primary ultrafine pulverizing units; alternatively, the at least two pulverizers, one classifier and one cyclone collector are connected in series, wherein the first outlet of the classifier is connected to cyclone collector inlet, the second outlet of the classifier and the cyclone collector outlet are connected in parallel to the pulverizer inlet of the another group of secondary pulverizing units; in a last group of secondary pulverizing units, the second outlet of the classifier is connected to a first stock bin, the cyclone collector outlet is connected to a first tailing bin, the cyclone collector dust outlet is connected to dust removal equipment; and
   the speed of classifying impellers of the pulverizers is increased from 2500 rpm to 4000 rpm one by one, and the speed increment of each pulverizer from the second one is equal; and a pulverization time of each pulverizer is 20-35 minutes, or
   the speed of the classifying impeller of the classifier is maintained at 3500 rpm.

5. The method according to claim 4, wherein, in step (2), the graphite powder collected from the second outlet of the classifier and the cyclone collector outlet in the last group of secondary pulverizing units has a $D_{50}$ of 13-25 µm and a tap density less than 0.9 g/cm³.

6. The method according to claim 1, wherein, in step (3), each pulverizer has a pulverizer inlet and a pulverizer outlet, the classifier has a classifier inlet, a first outlet of the classifier, and a second outlet of the classifier, the cyclone collector has a cyclone collector inlet, a cyclone collector outlet, and a cyclone collector dust outlet; the at least two pulverizers, one classifier and one cyclone collector are connected in series, wherein, the first outlet of the classifier is connected to the cyclone collector inlet, the second outlet of the classifier and the cyclone collector outlet are connected in parallel to the pulverizer inlet of another group of final pulverizing units; in a last group of final pulverizing units, the second outlet of the classifier is connected to a first stock bin, the cyclone collector outlet is connected to a first tailing bin, the cyclone collector dust outlet is connected to dust removal equipment;
   the cyclone collector outlet and the outlet of the dust removal equipment are connected in parallel to the first tailing bin; and
   the speed of classifying impellers of the pulverizers is decreased from 3000 rpm to 2000 rpm one by one, and the speed decrement of each pulverizer is equal or unequal; and the pulverization time of each pulverizer is 20-25 minutes; or
   the speed of the classifying impeller of the classifier is 2500 rpm when there is only one group of final pulverizing units; or
   the speed of the classifying impellers of the classifiers reduces from 3500 rpm to 2500 rpm one by one when there are two or more groups of final pulverizing units.

7. The method according to claim 6, wherein, in step (3), the graphite tailing particles collected in the first tailing bin has a $D_{50}$ of 8-13 µm, a particle size in the range of 1-45 µm, and a tap density of larger than or equal to 0.3 g/cm³.

8. The method according to claim 7, wherein, in step (3), the particle size is in the range of 5-40 µm and the tap density is 0.3-0.6 g/cm³.

9. The method according to claim 1, wherein, in step (3), graphite particles in a graphic powder collected from a second outlet of the classifier in a last group of the final pulverizing units have a shape that is spherical, approximately spherical, oval, or potato-shaped; a $D_{50}$ of 13-25 µm; a particle size in a range of 3.5-60 µm; a tap density larger than or equal to 0.9 g/cm³, and a specific surface area of 4.5-8.5 m²/g.

10. The method according to claim 9, wherein, in step (3), the tap density is 0.9-1.2 g/cm³.

11. The method according to claim 1, wherein, in step (4), each ultrafine pulverizer has an ultrafine pulverizer inlet and an ultrafine pulverizer outlet, the ultrafine classifier has an ultrafine classifier inlet, a first outlet of the ultrafine classifier, and a second outlet of the ultrafine classifier, the cyclone collector has a cyclone collector inlet, a cyclone collector outlet, and a cyclone collector dust outlet; the at least two ultrafine pulverizers, one ultrafine classifier and one cyclone collector are connected in series, wherein, the first outlet of the ultrafine classifier is connected to the cyclone collector inlet, the second outlet of the ultrafine classifier and the cyclone collector outlet are connected in parallel another group of primary ultrafine pulverizing units, or connected in parallel to the inlet of the secondary ultrafine pulverizing units, and the cyclone collector dust outlet is connected to dust removal equipment; and the speed of classifying impellers of the ultrafine pulverizers is increased from 800 rpm to 1600 rpm one by one, and the speed increment of each pulverizer from the second one is equal or unequal; and the pulverization time of each ultrafine pulverizer is 15-25 minutes; or the speed of the classifying impeller of the ultrafine classifier is maintained at 5000 rpm.

12. The method according to claim 11, wherein, in step (4), the graphite powder collected from the second outlet of the ultrafine classifier and the cyclone collector outlet in the last group of the primary ultrafine pulverizing units has a $D_{50}$ of 5-14 µm and a tap density of 0.7-0.85 g/cm³.

13. The method according to claim 1, wherein, in step (5), each ultrafine pulverizer has an ultrafine pulverizer inlet and an ultrafine pulverizer outlet, the ultrafine classifier has an ultrafine classifier inlet, a first outlet of the ultrafine classifier and a second outlet of the ultrafine classifier, the cyclone collector has a cyclone collector inlet, a cyclone collector outlet, and a cyclone collector dust outlet; the at least two ultrafine pulverizers, one ultrafine classifier and one cyclone collector are connected in series, wherein, the first outlet of the ultrafine classifier is connected to the cyclone collector inlet, the second outlet of the ultrafine classifier and the cyclone collector outlet are connected in parallel to another group of secondary ultrafine pulverizing units, or connected in parallel to the inlet of the final ultrafine pulverizing units, and the cyclone collector dust outlet is connected to dust removal equipment; and the speed of classifying impellers of the ultrafine pulverizers is increased from 1000 rpm to 2000 rpm one by one, and the speed increment of each pulverizer from the second one is equal or unequal; and the pulverization time of each ultrafine pulverizer is 20-35 minutes; or the speed of the classifying impeller of the ultrafine classifier is maintained at 5000 rpm.

14. The method according to claim 13, wherein, in step (5), the graphite powder collected from the second outlet of the ultrafine classifier and the cyclone collector outlet in the last group of secondary ultrafine pulverizing units has a $D_{50}$ of 3-12 µm and a tap density of less than 0.6 g/cm³.

15. The method according to claim 1, wherein, in step (6), each ultrafine pulverizer has an ultrafine pulverizer inlet and an ultrafine pulverizer outlet, the ultrafine classifier has an ultrafine classifier inlet, a first outlet of the ultrafine classifier, and a second outlet of the ultrafine classifier, the cyclone collector has a cyclone collector inlet, a cyclone collector outlet, and a cyclone collector dust outlet; the at least two ultrafine pulverizers, one ultrafine classifier and one cyclone collector are connected in series, wherein, the first outlet of the ultrafine classifier is connected to the cyclone collector inlet, the second outlet of the ultrafine classifier and the cyclone collector outlet are connected in parallel to the pulverizer inlet in another group of final ultrafine pulverizing units; in a last group of final ultrafine pulverizing units, the second outlet of the ultrafine classifier is connected to a second stock bin, the cyclone collector outlet is connected to a second tailing bin; and the cyclone collector dust outlet is connected to dust removal equipment;

the cyclone collector outlet and the outlet of the dust removal equipment are connected in parallel to the first tailing bin; and the speed of classifying impellers of the ultrafine pulverizers is decreased from 1600 rpm to 1000 rpm one by one, the speed decrement of each pulverizer is equal or unequal; and the pulverization time of each ultrafine pulverizer is 10-15 minutes; or the speed of the classifying impellers of the ultrafine classifiers is decreased from 5000 rpm to 3000 rpm one by one.

16. The method according to claim 1, wherein, in step (6), graphite particles in the graphite powder collected in a second stock bin have a shape that is spherical, approximately spherical, oval, and potato-shaped; a $D_{50}$ of 3-12 µm graphite a particle size in a range of 1-45 µm; a tap density larger than or equal to 0.55 g/cm³; and a specific surface area of 8.5-15.0 m²/g.

17. The method according to claim 16, wherein, in step (6), the particle size is in the range of 6-30 µm and the tap density is 0.55-0.9 g/cm³.

18. The method according to claim 1, comprising step (7), wherein, in step (7), the purification is performed by reacting an acidic aqueous solution with the graphite powder obtained from step (6); wherein, the acidic aqueous solution is selected from hydrochloric acid, hydrofluoric acid, nitric acid, sulfuric acid, and mixtures thereof.

19. The method according to claim 1, wherein, in step (1), conveying natural flake graphite or earthy graphite with a particle size of 0.074-0.8 mm and a carbon content of more than 90% into 2-8 groups of primary pulverizing units in series;

in step (2), conveying the graphite powder obtained in step (1) into 1-6 groups of secondary pulverizing units in series; and in step (3), conveying the graphite powder obtained in step (2) into 1-6 groups of final pulverizing units in series.

20. The method according to claim 1, wherein, in step (4), conveying the graphite tailing obtained in step (3) into 2-8 groups of primary ultrafine pulverizing units in series;

in step (5), conveying the graphite powder collected in step (4) into 1-6 groups of secondary ultrafine pulverizing units in series; and in step (6), conveying the graphite powder collected in step (5) into 2-10 groups of final ultrafine pulverizing units in series.

\* \* \* \* \*